United States Patent
Verrall et al.

(10) Patent No.: US 8,287,756 B2
(45) Date of Patent: Oct. 16, 2012

(54) BIAXIAL FILM II

(75) Inventors: Mark Verrall, Shilin (TW); Kim Slaney, Christchurch (GB); Owain Llyr Parri, Ringwood (GB); Richard Harding, Hants (GB); Shirley Ann Marden, Poole Dorset (GB)

(73) Assignee: Merck Patent Gesellschaft mit Beschränkter Haftung, Darmstadt (DE)

( * ) Notice: Subject to any disclaimer, the term of this patent is extended or adjusted under 35 U.S.C. 154(b) by 1296 days.

(21) Appl. No.: 11/631,681

(22) PCT Filed: Jun. 15, 2005

(86) PCT No.: PCT/EP2005/006418
§ 371 (c)(1),
(2), (4) Date: Jan. 28, 2008

(87) PCT Pub. No.: WO2006/002766
PCT Pub. Date: Jan. 12, 2006

(65) Prior Publication Data
US 2008/0113111 A1  May 15, 2008

(30) Foreign Application Priority Data
Jul. 7, 2004 (EP) .................................. 04015969

(51) Int. Cl.
*C09K 19/00* (2006.01)
*C09K 19/52* (2006.01)
*G02F 1/13* (2006.01)
*G02F 1/1333* (2006.01)
*G02F 1/1337* (2006.01)

(52) U.S. Cl. ................. 252/299.01; 252/299.6; 428/1.1; 349/1; 349/56; 349/86; 349/182

(58) Field of Classification Search ....................... None
See application file for complete search history.

(56) References Cited

U.S. PATENT DOCUMENTS

| 6,685,998 | B1 | 2/2004 | Nishikawa et al. |
| 7,582,227 | B2 * | 9/2009 | Verall et al. ............. 252/299.01 |
| 7,724,330 | B2 * | 5/2010 | Parri et al. ..................... 349/117 |
| 7,724,530 | B2 * | 5/2010 | Clayton et al. ................ 361/749 |
| 2005/0219447 | A1 | 10/2005 | Slaney |

FOREIGN PATENT DOCUMENTS

| WO | WO 03/054111 A | 7/2003 |
| WO | WO 2004/090024 A | 10/2004 |

* cited by examiner

*Primary Examiner* — Geraldina Vlsconti
(74) *Attorney, Agent, or Firm* — Millen, White, Zelano & Branigan, P.C.

(57) ABSTRACT

The invention relates to an optically biaxial film comprising an anisotropic material with uniform helically twisted structure and a reflection wavelength below 400 nm, to methods and materials for its preparation, to its use as retardation or compensation film in optical devices like liquid crystal displays, and to compensators and liquid crystal displays comprising such a biaxial film.

24 Claims, 6 Drawing Sheets

| A) | B) | C) |
|---|---|---|
| Polariser 1 | Polariser 1 | Polariser 1 |
| TAC | TAC | TAC |
| O-Plate 1 | O-Plate 1 | O-Plate 1 |
| A-Plate 1 | -C-Plate 1 | Biaxial Film 1 |
| -C-Plate 1 | A-Plate 1 | LC Cell |
| LC Cell | LC Cell | Biaxial Film 2 |
| -C-Plate 2 | A-Plate 2 | O-Plate 2 |
| A-Plate 2 | -C-Plate 2 | TAC |
| O-Plate 2 | O-Plate 2 | Polariser 2 |
| TAC | TAC | |
| Polariser 2 | Polariser 2 | |

BIAXIAL FILM II

FIELD OF INVENTION

The invention relates to an optically biaxial film, methods and materials for its preparation, its use in optical devices like compensators and liquid crystal displays, and to compensators and liquid crystal displays comprising such a biaxial film.

BACKGROUND AND PRIOR ART

Optical compensators are used in prior art to improve the optical properties of liquid crystal displays (LCD), such as the contrast ratio and the grey scale representation at large viewing angles. For example in uncompensated displays of the TN or STN type at large viewing angles often a change of the grey levels and even grey scale inversion, as well as a loss of contrast and undesired changes of the colour gamut are observed.

An overview of the LCD technology and the principles and methods of optical compensation of LCDs is given in U.S. Pat. No. 5,619,352, the entire disclosure of which is incorporated into this application by way of reference. As described in U.S. Pat. No. 5,619,352, to improve the contrast of a display at wide viewing angles a negatively birefringent C-plate compensator can be used, however, such a compensator does not improve the greyscale representation of the display. On the other hand, to suppress or even eliminate grey scale inversion and improve the grey scale stability U.S. Pat. No. 5,619,352 suggests to use a birefringent O-plate compensator. An O-plate compensator as described in U.S. Pat. No. 5,619,352 includes an O-plate, and may additionally include one or more A-plates and/or negative C-plates.

The terms 'O-plate', 'A-plate' and 'C-plate' as used in U.S. Pat. No. 5,619,352 and throughout this invention have the following meanings. An 'O-plate' is an optical retarder utilizing a layer of a positively birefringent (e.g. liquid crystal) material with its principal optical axis oriented at an oblique angle with respect to the plane of the layer. An 'A-plate' is an optical retarder utilizing a layer of uniaxially birefringent material with its extraordinary axis oriented parallel to the plane of the layer, and its ordinary axis (also called 'a-axis') oriented perpendicular to the plane of the layer, i.e. parallel to the direction of normally incident light. A 'C-plate' is an optical retarder utilizing a layer of a uniaxially birefringent material with its extraordinary axis (also called 'c-axis') perpendicular to the plane of the layer, i.e. parallel to the direction of normally incident light.

Negative birefringent C-plate retarders in prior art have been prepared for example from uniaxially compressed films of isotropic polymers, by vapour deposition of inorganic thin films, as described for example in U.S. Pat. No. 5,196,953, or from negatively birefringent liquid crystal materials. However, stretched or compressed polymer films often show only moderate birefringence and require high film thickness, vapour deposition requires complicated manufacturing procedures, and negatively birefringent liquid crystal materials are often less easily available and more expensive than positively birefringent materials.

To overcome these disadvantages, it has recently been suggested, for example in WO 01/20393 and WO 01/20394, to use a cholesteric liquid crystal film with short pitch, typically with its Bragg reflection band in the UV region of the electromagnetic spectrum. Such a film exhibits negative birefringent C-type retardation for wavelengths greater than its reflection maximum. The refractive index ellipsoid of this type of film approximates to that of a vertically aligned liquid crystal with negative birefringence. Such a retardation film can be used for example to cancel off-axis retardation in the homeotropically driven dark state of a TN-LCD, and thus significantly improve the viewing angle of the LC display.

WO 01/20393 discloses a compensator that is a combination of a planar A-plate, an O-plate and a negative C-plate, wherein the negative C-plate comprises a short-pitch cholesteric LC film. When used for example in a TN-LCD, this combination provides excellent contrast at horizontal viewing angles and reduces unwanted changes of the colour gamut. However, its performance at vertical viewing angles is limited. Furthermore, the use of multiple retardation films is expensive and raises manufacturing and durability problems.

One aim of the present invention is to provide an optical compensator which has improved performance for compensation of LCDs, is easy to manufacture, in particularly for mass production, and does not have the drawbacks of prior art compensators as described above. Another aim of the invention is to provide an improved method for its preparation. Other aims of the present invention are immediately evident to the person skilled in the art from the following detailed description.

The inventors have found that the above described problems can be solved, and an optical compensator with superior performance can be obtained, by combining multiple films in a single layer and by using a biaxial C-plate retarder. It was found that a biaxial negative C-plate retarder in its optical properties approximates to a combination of a planar A-plate and a negative C-plate, but shows better optical performance than such a combination. The in-plane anisotropy of the biaxial negative C-plate retarder ($\Delta n_{xy}$) approximates to the A-plate and the out-of-plane anisotropy ($\Delta n_{xz}$ and $\Delta n_{yz}$) to the negative C-plate. Simulations have shown that the optical performance of the biaxial negative C-plate retarder is surprisingly superior to that of the A-plate and negative C-plate stacked sequentially, and shows exceptionally good viewing-angle performance for liquid crystal displays. Furthermore, the use of a single biaxial film instead of two stacked films reduces costs and manufacturing problems.

Moreover, the inventors have found a new and improved method of preparing such a film, by using a polymerisable chiral liquid crystal material comprising a photosensitive compound, and irradiating the material with polarised UV light, leading to a change of shape or structure and thus a birefringence change of the photosensitive compounds in some parts of the film, which is then frozen in by polymerisation.

WO 03/01544 discloses a cholesteric biaxial film having a deformed helix structure with an elliptical refractive index and a method of preparing such a film from a polymerisable cholesteric material comprising a dichroic photoinitiator. However, it does not disclose a biaxial film with uniform helical structure and varying birefringence obtained by the methods and from materials comprising a photosensitive compound as claimed in the present invention.

U.S. Pat. No. 6,685,998 discloses a compensator comprising a transparent substrate and a film formed from rod-like liquid crystal molecules, wherein said film has three different principal refractive indices and the liquid crystal molecules are oriented in cholesteric alignment. However, it does not disclose a biaxial cholesteric film reflecting in the UV range and having a periodically varying birefringence obtained by the methods and from the materials as claimed in the present invention.

DEFINITION OF TERMS

The terms 'photoreactive', 'photosensitive' and 'photoreaction' refer to compounds which change their structure or shape upon photoirradiation by reactions including, but not limited to, photoisomerisation, photo-induced 2+2 cycloaddition, photo-fries arrangement or a comparable photodegradation process. Photopolymerisation reactions are not included in these meanings. However, the photoreactive or photosensitive compounds as described in this invention can in addition also be polymerisable or photopolymerisable.

The term 'film' includes rigid or flexible, self-supporting or free-standing films with mechanical stability, as well as coatings or layers on a supporting substrate or between two substrates.

The term 'liquid crystal or mesogenic material' or 'liquid crystal or mesogenic compound' means materials or compounds comprising one or more rod-shaped, board-shaped or disk-shaped mesogenic groups, i.e. groups with the ability to induce liquid crystal (LC) phase behaviour. LC compounds with rod-shaped or board-shaped groups are also known in the art as 'calamitic' liquid crystals. LC compounds with a disk-shaped group are also known in the art as 'discotic' liquid crystals. The compounds or materials comprising mesogenic groups do not necessarily have to exhibit an LC phase themselves. It is also possible that they show LC phase behaviour only in mixtures with other compounds, or when the mesogenic compounds or materials, or the mixtures thereof, are polymerised.

For the sake of simplicity, the term 'liquid crystal material' is used hereinafter for both mesogenic and LC materials.

Polymerisable compounds with one polymerisable group are also referred to as 'monoreactive' compounds, compounds with two polymerisable groups as 'direactive' compounds, and compounds with more than two polymerisable groups as 'multireactive' compounds. Compounds without a polymerisable group are also referred to as 'non-reactive' compounds.

The term 'reactive mesogen' (RM) means a polymerisable mesogenic or liquid crystal compound.

The term 'director' is known in prior art and means the preferred orientation direction of the long molecular axes (in case of calamitic compounds) or short molecular axis (in case of discotic compounds) of the mesogenic groups in an LC material.

In films comprising uniaxially positive birefringent LC material the optical axis is given by the director.

The term 'cholesteric structure' or 'helically twisted structure' refers to a film comprising LC molecules wherein the director is parallel to the film plane and is helically twisted around an axis perpendicular to the film plane.

The term 'homeotropic structure' or 'homeotropic orientation' refers to a film wherein the optical axis is substantially perpendicular to the film plane.

The term 'planar structure' or 'planar orientation' refers to a film wherein the optical axis is substantially parallel to the film plane.

The term 'tilted structure' or 'tilted orientation' refers to a film wherein the optical axis is tilted at an angle θ between 0 and 90° relative to the film plane.

The term 'splayed structure' or 'splayed orientation' means a tilted orientation as defined above, wherein the tilt angle varies in the direction perpendicular to the film plane, preferably from a minimum to a maximum value.

The average tilt angle $\theta_{ave}$ is defined as follows $$\theta_{ave} = \frac{\sum_{d'=0}^{d} \theta'(d')}{d}$$

wherein θ'(d') is the local tilt angle at the thickness d' within the film, and d is the total thickness of the film.

The tilt angle of a splayed film hereinafter is given as the average tilt angle $\theta_{ave}$, unless stated otherwise.

For sake of simplicity, an optical film with twisted, planar, homeotropic, tilted or splayed orientation or structure is hereinafter also referred to as 'twisted film', 'planar film', 'homeotropic film', 'tilted film' or 'splayed film', respectively.

Tilted and splayed films are also referred to as 'O plate'. A planar film is also referred to as 'A plate' or 'planar A plate'.

"E-mode" refers to a twisted nematic liquid crystal display (TN-LCD) where the input polarisation direction is substantially parallel to the director of the LC molecules when entering the display cell, i.e. along the extraordinary (E) refractive index. "O-mode" refers to a TN-LCD where the input polarisation is substantially perpendicular to the director when entering the display cell, i.e. along the ordinary (O) refractive index.

SUMMARY OF THE INVENTION

The invention relates to an optically biaxial film that comprises an anisotropic material with helically twisted structure and a uniform helix and reflects light of a wavelength below 400 nm.

The invention further relates to an optically biaxial film as described above and below having a local birefringence that varies periodically in the direction of the helical axis.

The invention further relates to a method of preparing a biaxial film as described above and below.

The invention further relates to the use of a biaxial film as described above and below as retardation or compensation film in optical devices like for example liquid crystal displays.

The invention further relates to a compensator comprising a biaxial film as described above and below.

The invention further relates to a liquid crystal display comprising a compensator or biaxial film as described above and below.

BRIEF DESCRIPTION OF THE DRAWINGS

FIG. 3 schematically depicts compensated TN-LCDs according to prior art (A, B) and according to the present invention (C).

DETAILED DESCRIPTION OF THE INVENTION

When using a compensator comprising a biaxial film according to the present invention in an LCD, the contrast at large viewing angles and the grey level representation of the display are considerably improved, and grey scale inversion is suppressed. In case of coloured displays, the colour stability is considerably improved and changes of the colour gamut are suppressed. Furthermore, a compensator according to the present invention is particularly suitable for mass production.

Especially preferred is a biaxial retardation film which has optically biaxial negative C symmetry with $n_x \neq n_y \neq n_z$ and $n_x$, $n_y > n_z$, wherein $n_x$ and $n_y$ are the principal refractive indices in orthogonal directions in the film plane and $n_z$ is the principal refractive index perpendicular to the film plane.

The biaxial film according to the present invention reflects circular polarized light of a wavelength of less than 400 nm. Especially preferred is a biaxial film reflecting light in the UV range or below the UV range, preferably light with a wavelength below 380 nm. Further preferred is a biaxial film that is substantially transparent for light with a wavelength of 400 nm or higher, preferably 380 nm or higher. Very preferably the biaxial film is substantially transparent for visible light with a wavelength from 380 to at least 780 nm.

The thickness of the biaxial film is preferably from 0.5 to 5 μm, very preferably from 1 to 3 μm.

The on-axis retardation (i.e. at 0° viewing angle) of a biaxial film according to the present invention is preferably from 60 nm to 400 nm, especially preferably from 100 nm to 350 nm. In another preferred embodiment the biaxial film has a retardation of preferably from 10 to 200 nm, very preferably from 20 to 150 nm.

For some LCD uses it is preferred that the biaxial film shows a retardation of approximately 0.25 times of the wavelength of incident light, also known in prior art as quarter-wave retardation film (QWF) or λ/4-plate. Especially preferred for such uses are retardation values from 90 to 200 nm, preferably from 100 to 175 nm.

For other LCD uses it is preferred that the biaxial film shows a retardation of approximately 0.5 times of the wavelength of incident light, also known in prior art as half-wave retardation film (HWF) or λ/2-plate. Especially preferred for such uses are retardation values from 180 to 400 nm, preferably from 200 to 350 nm.

Preferably the biaxial film exhibits a cholesteric structure. The helical pitch of the cholesteric helix in such a biaxial film is preferably chosen below 225 nm, and the reflection wavelength is preferably smaller than 380 nm which is below visible wavelengths.

Figure 1:
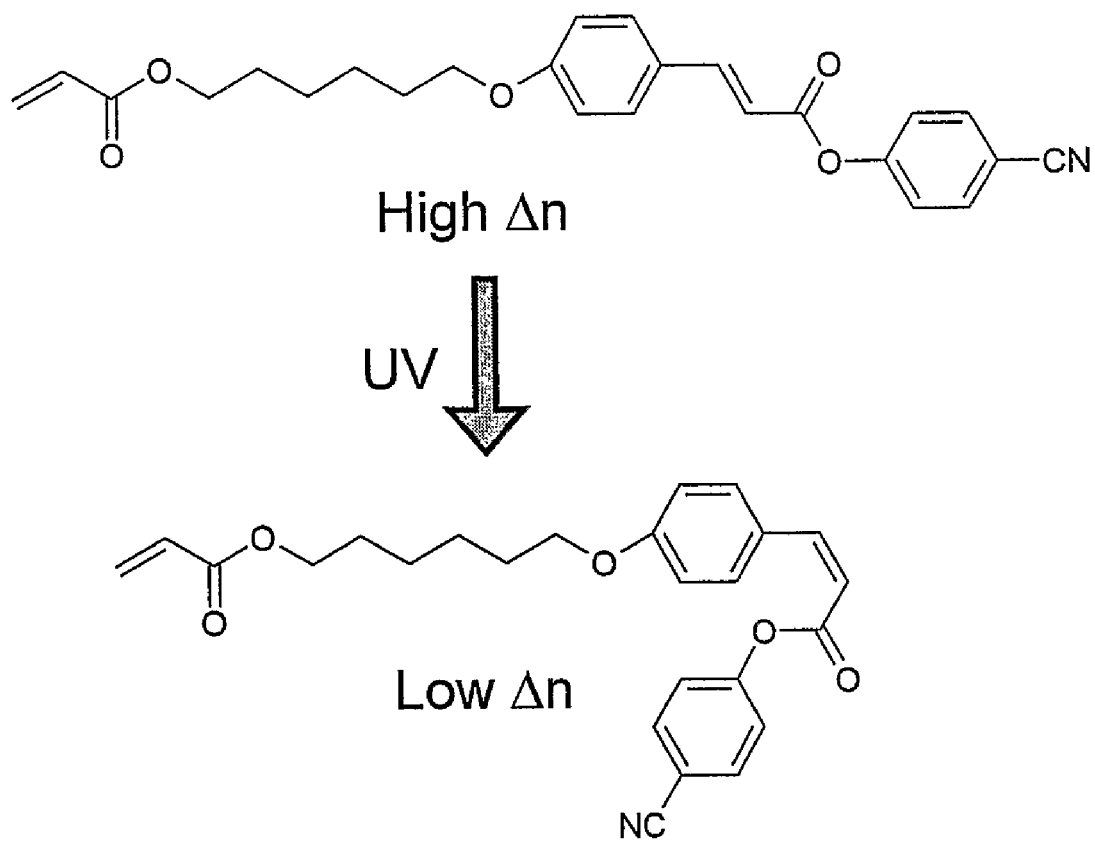
FIG. 1 exemplarily illustrates the change of shape of a photosensitive mesogenic compound upon UV radiation.

The film is preferably prepared from a chiral polymerisable mesogenic or liquid crystal material, especially preferably a polymerisable liquid crystal material with a cholesteric phase. The material is preferably a mixture of monomeric compounds selected from mono-, di- or multifunctional polymerisable compounds and non-polymerisable compounds. One or more of these compounds are chiral compounds which induce the helically twisted cholesteric structure. Also, one or more of these compounds, preferably in an amount from 5 to 100% by weight, are photosensitive or photoreactive compounds, like for example mesogenic or liquid crystalline cinnamates. These photosensitive compounds, when irradiated e.g. with UV light, show a change in shape and/or refractive index as exemplarily depicted in FIG. 1. This leads to a change in birefringence locally within selected parts of the cholesteric helix. Furthermore, the material preferably comprises one or more photoinitiators, preferably UV photoinitiators.

The polymerisable material is preferably coated as a thin film onto a substrate, where it adopts a planar orientation with the cholesteric helix being substantially perpendicular to the plane of the film. Optionally alignment of the polymerisable material into planar orientation is aided by additional means or techniques, like for example by adding aligning agents such as surfactants, or by treating the substrate with an alignment layer and/or rubbing the substrate or the alignment layer. Suitable means and techniques are known to those skilled in the art. The amount and helical twisting power (HTP) of the chiral compounds is preferably selected such that the cholesteric material has a short pitch and a reflection wavelength <380 nm.

Upon photoradiation of the aligned cholesteric material, the photosensitive compound(s) is/are converted into a form having different birefringence as mentioned above. Since the material is irradiated with polarised light, only those domains of the helix in which the LC director falls along the direction of polarised light will undergo photoreaction, thus reducing the birefringence only in those areas.

At the same time the (UV) photoinitiator(s) begin the polymerisation process which 'fixes' the helix structure whilst 'trapping' the photosensitive materials in their high or low birefringence state according to their position within the helix. In this way the helix structure remains uniform but the birefringence varies locally through the helix, leading to a biaxial optical film.

By varying the dose of the photoradiation, e.g. the radiation intensity and/or exposure time, the degree of isomerisation and thus the final retardation of the biaxial film can be varied. For example, higher intensity and longer exposure time lead to a higher degree of isomerisation and thus to a decrease in retardation.

It is also possible, by varying the polarisation direction of the linear polarised photoradiation, to control the direction of the slow axis of the biaxial film. The "slow axis" corresponds to the direction of the highest refractive index, e.g. in a film wherein $n_x > n_y > n_z$ the direction of the slow axis is that of $n_x$ (in the film plane). For example, irradiation with linear polarised UV light can be achieved by passing UV light through a linear polariser (e.g. a commercially available dye-doped absorption polariser). The direction of the slow axis in the resulting biaxial film will then correspond to the direction of the transmission axis of the polariser. By rotating the polariser, the direction of the slow axis can thus be controlled.

Figure 2:
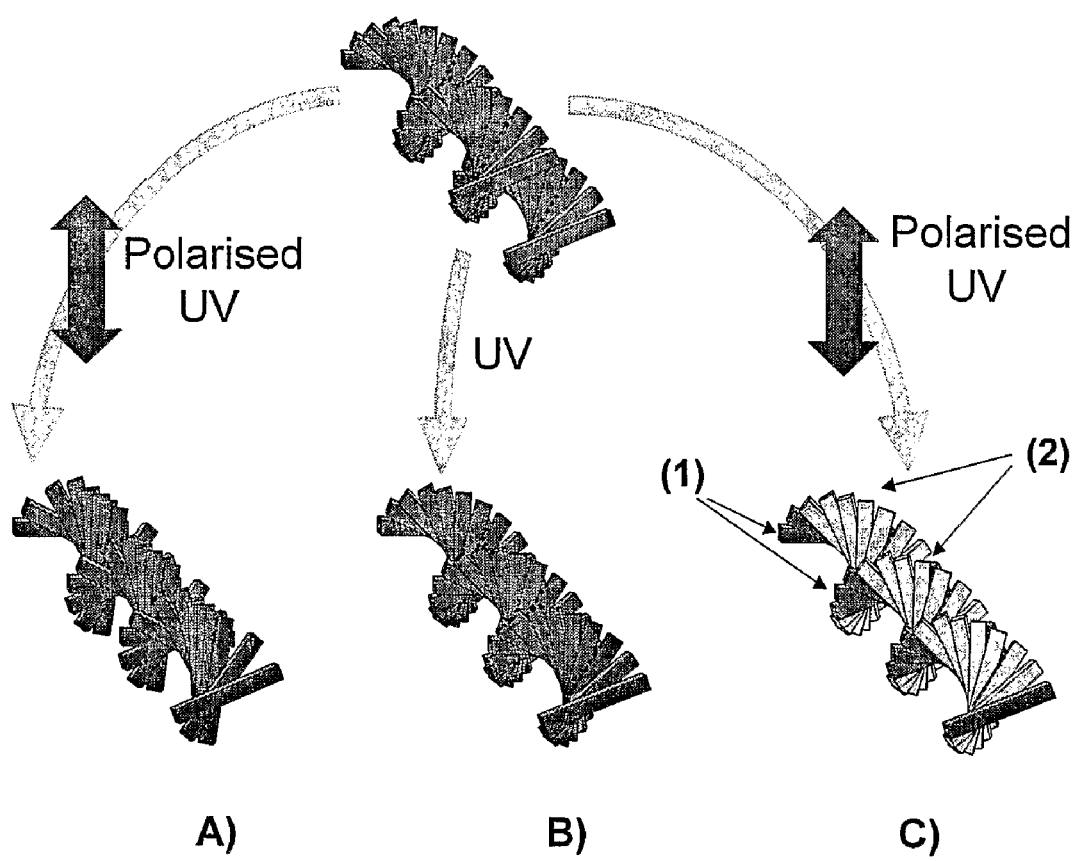
FIG. 2 illustrates a method of preparing a biaxial film according to prior art (A), a method of preparing a uniaxial film according to prior art (B) and a method of preparing a biaxial film according to the present invention (C).

FIG. 2 schematically depicts the helix structure in a biaxial cholesteric film of the present invention (C), compared with the helix structure in a biaxial cholesteric film of prior art (A) as described in WO 03/054111 and the helix structure in an uniaxial cholesteric film of prior art (B).

The biaxial film of FIG. 2A is obtained from a polymerisable cholesteric material comprising a dichroic photoinitiator by irradiation with linearly polarised light as described in WO 03/054111. As a result of this process the biaxial film has a deformed helix structure, but does not show local variation of the birefringence.

Irradiation of a polymerisable cholesteric material with unpolarised light leads to an overall reduction of the birefringence in the film and thus to an optically uniaxial film as depicted in FIG. 2B.

In contrast, the film of FIG. 2C obtained by a process according to the present invention has uniform helix (i.e. not deformed as in WO03/054111) but a periodically varying birefringence with regions of high birefringence (1) and regions with low birefringence (2).

The biaxial film according to the present invention has a uniform helix and a circular, discotic refractive index ellipsoid.

In the biaxial film according to the present invention the helical pitch is reduced to values well below the visible wavelengths, so that only the average directional refractive indices are experienced. As a consequence the Bragg reflection bands occur in the UV, so the film is transparent to visible wavelengths of light and behaves purely as retarders for these visible wavelengths.

In this way a cholesteric film with optical biaxial negative C-type symmetry can be produced which can act as retarder for linear polarised light of wavelengths in the visible spectrum.

Alternatively the process according to the present invention can be carried out such that in a first step polymerisation is achieved by irradiation with non-polarised light, preferably non-polarised UV light, to fix the polymer helix, and in a second step the birefringence in selected parts of the helix structure is changed by irradiation with polarised light, preferably polarised UV light.

It is also possible to carry out photoreaction and photopolymerisation simultaneously.

Alternatively to photopolymerisation as described above and below, the polymerisable chiral mesogenic material can also be polymerised by other techniques like for example thermal polymerisation according or in analogy to known methods.

Another object of the invention is a process of preparing a biaxial retardation film as described above and below, preferably a process comprising the following steps
A) providing a layer of a chiral polymerisable mesogenic material comprising at least one photosensitive compound, at least one chiral compound and at least one polymerisable compound, wherein these compounds can be identical or different, on a substrate where it aligns into planar orientation or is optionally aligned into planar orientation,
B) irradiating the material with linear polarised light, preferably linear polarised UV light, to induce photoreaction of the photosensitive compound(s) in selected regions of the material,
C) polymerising the chiral mesogenic material,
D) optionally removing the polymerised material from the substrate.

The invention further relates to a process as described above, wherein step C) is carried out before or simultaneously with step B).

The invention further relates to a biaxial film with cholesteric structure obtainable or obtained by a process as described above and below.

Patterned Biaxial Film

The invention further relates to an optically biaxial film having a uniform helical structure and comprising at least two regions with different birefringence, or comprising a pattern of two or more regions having different birefringence. The variation of birefringence leads to a variation of retardation in the different areas of the film.

Such a film can be prepared by the method as described above, wherein only selected parts of the polymerizable mixture are exposed to photoradiation, e.g. by using a photomask, or wherein different parts of the polymerizable mixture are exposed to different intensities of photoradiation, e.g. by using a shaded photomask with different areas having different transmission of photoradiation or by using a radiation source with variable intensity.

Especially preferred is a biaxial film according to the present invention that comprises a pattern of one or more, preferably one, two or three different regions having different values of the retardation, each of said values being adjusted such that its efficiency of converting linearly polarised light into circularly polarised light is optimised for light of one of the primary colours red, green and blue (R, G, B). In particular, said values of retardation correspond to a quarter of the wavelength of the respective colour and are preferably as follows:

For red light of a wavelength of 600 nm the retardation is from 140 to 190 nm, preferably 145 to 180 nm, very preferably 145 to 160 nm, most preferably 150 nm.

For green light of a wavelength of 550 nm the retardation is from 122 to 152 nm, preferably 127 to 147 nm, very preferably 132 to 142 nm, most preferably 137 nm.

For blue light of a wavelength of 450 nm the retardation is from 85 to 120 nm, preferably 90 to 115 nm, very preferably 100 to 115 nm, most preferably 112 nm.

The retardation of the film can be varied e.g. by varying the intensity and/or the duration of the photoradiation that causes isomerisation. Preferably the patterned biaxial retardation film is prepared by a process comprising the following steps
A) providing a layer of a chiral polymerisable mesogenic material comprising at least one photosensitive compound, at least one chiral compound and at least one polymerisable compound, wherein these compounds can be identical or different, on a substrate where it aligns into planar orientation or is optionally aligned into planar orientation,
B) irradiating the material with linear polarised light, preferably linear polarised UV light such that selected regions of the material receive different amounts of UV power, e.g. through a photomask, to induce photoreaction of the photosensitive compound(s), so that the photosensitive compounds in the selected regions show photoreaction to a different extent than in the non-selected regions,
C) polymerising the chiral mesogenic material,
D) optionally removing the polymerised material from the substrate.

The biaxial film according to the present invention can be used alone or in combination with other retardation films as compensator or retarder, in particular for viewing angle compensation in LCDs.

Preferably the biaxial film is used in combination with an additional retarder selected from the group of A-plate, C-plate and O-plate retarders or anisotropic or liquid crystal films having planar, homeotropic, tilted or splayed structure. Especially preferably the biaxial film is used in combination with at least one O-plate retarder having tilted or splayed structure, very particularly preferably with splayed structure.

Thus, the invention further relates to a compensator comprising at least one biaxial retardation film as described above and below, and optionally further comprising at least one O-plate retarder with splayed or tilted structure.

Suitable examples of O-plate retarders that can be used in a compensator according to the present invention and their manufacture are described in WO 01/20393, the entire disclosure of which is incorporated into this application by reference.

The individual optical films like polarisers and retarders can be laminated together, or connected by means of adhesive layers, like for example TAC or DAC (tri- or diacetylcellulose) films.

Another object of the present invention is a liquid crystal display comprising at least one biaxial film or compensator as described above and below.

Especially preferably the liquid crystal display device comprises the following elements
  a liquid crystal cell formed by two transparent substrates having surfaces which oppose each other, an electrode layer provided on the inside of at least one of said two transparent substrates and optionally superposed with an alignment layer, and a liquid crystal medium which is present between the two transparent substrates,
  a polariser arranged outside said transparent substrates, or a pair of polarisers sandwiching said substrates, and at least one biaxial film or compensator according to the present invention, being situated between the liquid crystal cell and at least one of said polarisers, it being possible for the above elements to be separated, stacked, mounted on top of each other or connected by means of adhesive layers in any combination of these means of assembly.

The biaxial film and compensator according to the present invention can be used for compensation of conventional displays, in particular those of the TN (twisted nematic), HTN (highly twisted nematic) or STN (super twisted nematic) mode, in AMD-TN (active matrix driven TN) displays, in displays of the IPS (in plane switching) mode, which are also known as 'super TFT' displays, in displays of the DAP (deformation of aligned phases) or VA (vertically aligned) mode, like e.g. ECB (electrically controlled birefringence), CSH (colour super homeotropic), VAN or VAC (vertically aligned nematic or cholesteric) displays, MVA (multi-domain vertically aligned) displays, in displays of the bend mode or hybrid type displays, like e.g. OCB (optically compensated bend cell or optically compensated birefringence), R-OCB (reflective OCB), HAN (hybrid aligned nematic) or pi-cell (π-cell) displays, furthermore for transflective displays.

In the following, compensated displays according to preferred embodiments of the present invention are described.

Computer simulations as described below are performed using the Berreman 4×4 matrix method for stratified anisotropic media.

Twisted Nematic (TN) Mode

FIGS. 3A and 3B show a compensated TN display according to prior art, comprising an LC cell with a nematic liquid crystal mixture in twisted nematic orientation in the off-state, a compensator comprising a planar A-plate, a (uniaxial) negative C-plate and a splayed O-plate on each side of the cell, and two polarisers with their polarisation axes crossed at right angles sandwiching the cell and the compensators.

FIG. 3C exemplarily shows a compensated TN display according to a first preferred embodiment of the present invention, wherein, compared to FIGS. 3A and 3B, the compensator comprises a single biaxial negative C film according to the present invention instead of separate A-plate and negative C-plate retarders.

Computer simulations have shown that, in certain configurations, a compensator as shown in FIG. 3C significantly improves the optical performance of a TN display. The compensator configurations are dependent on the wave-guiding mode (O-mode or E-mode) and the relative position of the splayed and biaxial films. Modelling has also shown that the optical performance achieved with a compensator according to FIG. 3C, comprising a single biaxial film plus a splayed film, can be significantly better than that achieved with a compensator according to FIG. 3A or 3B, comprising separate A- and negative C-plates stacked sequentially with a splayed film.

In a compensation stack as shown for example in FIG. 3C, the ratio of the directional refractive indices of the inventive biaxial film is more important than their magnitude. For example, in case of a biaxial film with $n_x=1.65$, $n_y=1.60$ and $n_z=1.50$, excellent contrast is achieved with a film thickness of 1200 nm.

However, it is also possible for example to reduce the in and out-of-plane anisotropy ($\Delta n_{yz}$ and $\Delta n_{xy}$) by a factor, and to multiply the film thickness by the same factor, to obtain a film with substantially the same optical performance. This method is applicable to the biaxial films according to the present invention.

Multi-Domain Vertically Aligned (MVA) Mode

Computer simulation has shown that a display of the MVA mode can be compensated to achieve 10:1 contrast ratio up to an angle of 80° in all viewing directions using a negative C-plate and an A-plate. This type of compensation also improves the colour performance, reducing the off-axis colour washout.

Figure 4:
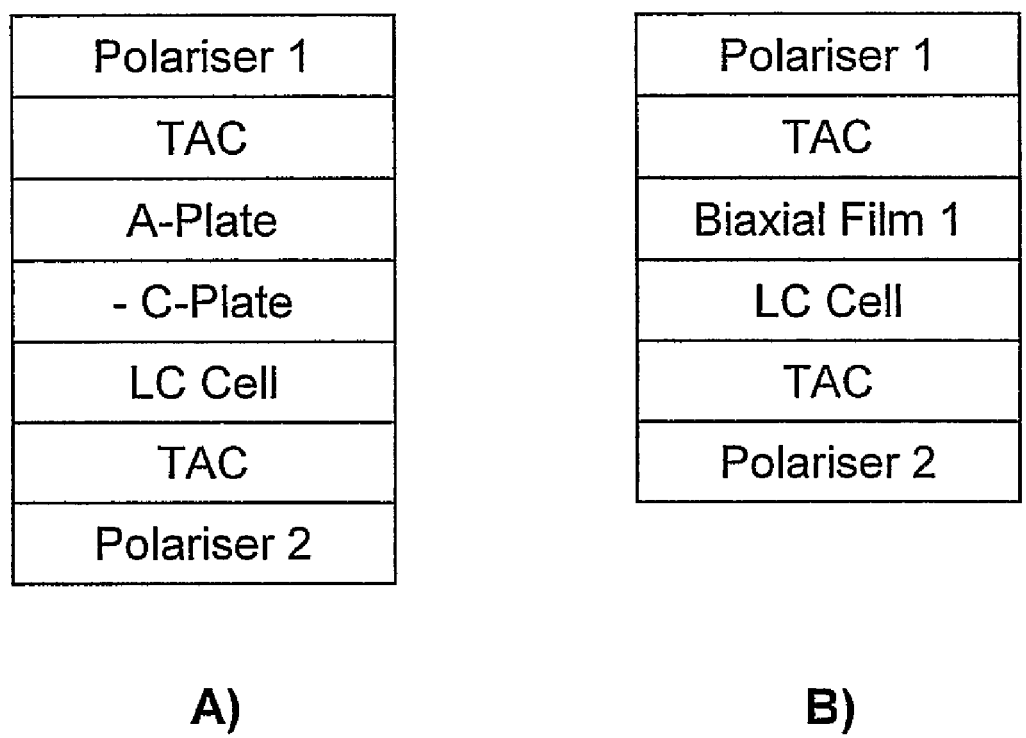
FIG. 4 schematically depicts compensated MVA-LCDs according to prior art (A) and according to the present invention (B).

FIG. 4A shows a compensated MVA display, comprising an LC cell with a nematic liquid crystal mixture in homeotropic orientation in the off-state, a compensator comprising a planar A-plate plus a (uniaxial) negative C-plate on one side of the LC cell, and two polarisers with their polarisation axes crossed at right angles sandwiching the cell and the compensator.

FIG. 4B exemplarily shows a compensated MVA display according to a second preferred embodiment of the present invention, comprising a homeotropic LC cell and a biaxial negative C film according to the invention on one side of the LC cell, sandwiched between two crossed polarisers.

As previously described, the combination of a negative C-plate and an A-plate (planar film) can be approximated as a biaxial negative C film. Application of a single biaxial negative C film to a display of the MVA mode as shown in FIG. 4B surprisingly results in improved contrast compared to the films applied separately as shown in FIG. 4A.

OCB or pi-Cell Mode

Figure 5:
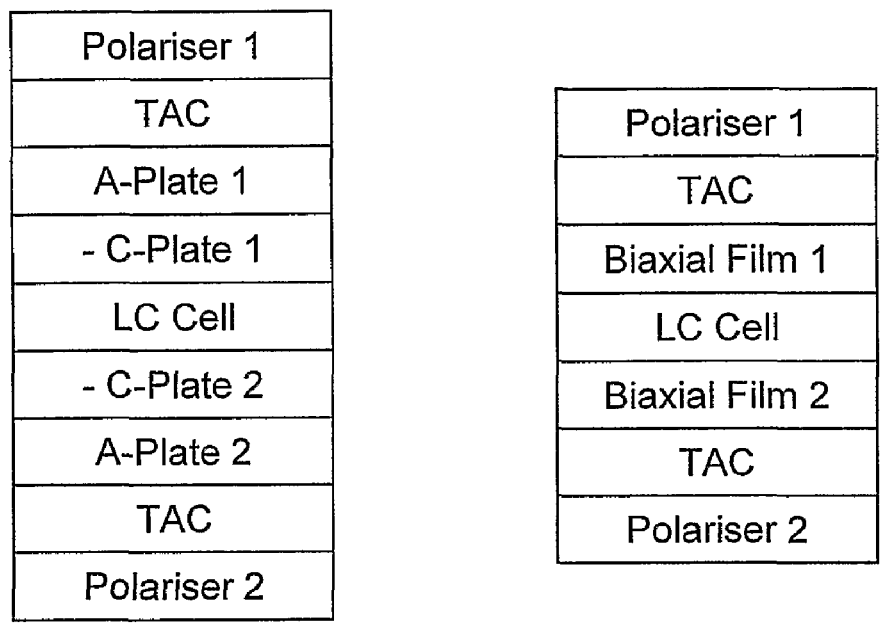
FIG. 5 schematically depicts compensated OCB-LCDs according to prior art (A) and according to the present invention (B).

FIG. 5A shows a compensated OCB mode display, comprising an LC cell with a nematic liquid crystal mixture with standard OCB configuration (homogeneous edge alignment and bent structure) in the off-state, a compensator comprising a planar A-plate plus a (uniaxial) negative C-plate on each side of the LC cell, and two polarisers with their polarisation axes crossed at right angles sandwiching the cell and the compensator.

FIG. 5B exemplarily shows a compensated OCB display according to a third preferred embodiment of the present invention, comprising an LC cell with bent structure, a biaxial negative C film according to the invention on each side of the LC cell, sandwiched between two crossed polarisers.

Computer simulations have shown that a single biaxial negative C film as shown in FIG. 5B can be used to replace a separate A-plate and negative C-plate as shown in FIG. 5A to yield comparable optical performance while reducing the number of different films in the stack.

Incell Use

In a further preferred embodiment, the biaxial film according to the present invention is used as optical retardation film in an LCD not outside the switchable LC cell of the display, but between the substrates, usually glass substrates, forming the switchable LC cell and containing the switchable LC medium (incell application).

Compared to conventional displays where optical retarders are usually placed between the LC cell and the polarisers, incell application of an optical retardation film has several advantages. For example, a display where the optical film is attached outside of the glass substrates forming the LC cell usually suffers from parallax problems, which can severely impair viewing angle properties. If the retardation films is prepared inside the LC display cell, these parallax problems can be reduced or even avoided.

Furthermore, incell application of the optical retardation film allows to reduce the total thickness of the LCD device, which is an important advantage for flat panel displays. Also, the displays become more robust. Especially advantageous for incell application is a film comprising polymerised LC material according to the present invention, as it can be made thinner due to the higher birefringence of the LC material compared e.g. to stretched plastic films. Thus, a film with a thickness of 2 microns or less can be used, which is especially suitable for incell applications.

Thus, the invention further relates to an LCD comprising a liquid crystal cell formed by two plane parallel substrates at least one of which is transparent to incident light, an electrode layer provided on the inside of at least one of said two transparent substrates and optionally superposed with an alignment layer, and a liquid crystal medium which is present between the two substrates and is switchable between at least two different states by application of an electric field, a first linear polariser on the first side of the liquid crystal cell, optionally a second linear polariser on the second side of the liquid crystal cell, characterized in that it comprises at least one biaxial film as described above and below that is positioned between the two plane parallel substrates of said liquid crystal cell.

A preferred LCD according to this embodiment comprises a liquid crystal (LC) cell comprising the following elements a first and a second substrate plane parallel to each other, at least one of which is transparent to incident light, an array of nonlinear electric elements on one of said substrates which can be used to individually switch individual pixels of said LC cell, said elements being preferably active elements like transistors, very preferably TFTs, a colour filter array provided on one of said substrates, preferably on the substrate opposite to that carrying the array of nonlinear elements, and having a pattern of different pixels transmitting one of the primary colours red, green and blue (R, G, B), said colour filter optionally being covered by a planarisation layer, a first electrode layer provided on the inside of said first substrate, optionally a second electrode layer provided on the inside of said second substrate, optionally first and second alignment layers provided on said first and second electrodes, an LC medium that is switchable between at least two different orientations by application of an electric field, a first (or 'front') linear polariser on the first side of the LC cell, optionally a second (or 'back') linear polariser on the second side of the LC cell, and at least one biaxial film as described above and below, characterized in that said biaxial film is situated between the first and second substrate of the LC cell, preferably between the colour filter and the liquid crystal medium, very preferably between the colour filter and one of said electrode layers, or if a planarisation layer is present, between the planarising layer and one of said electrode layers.

Figure 6A:
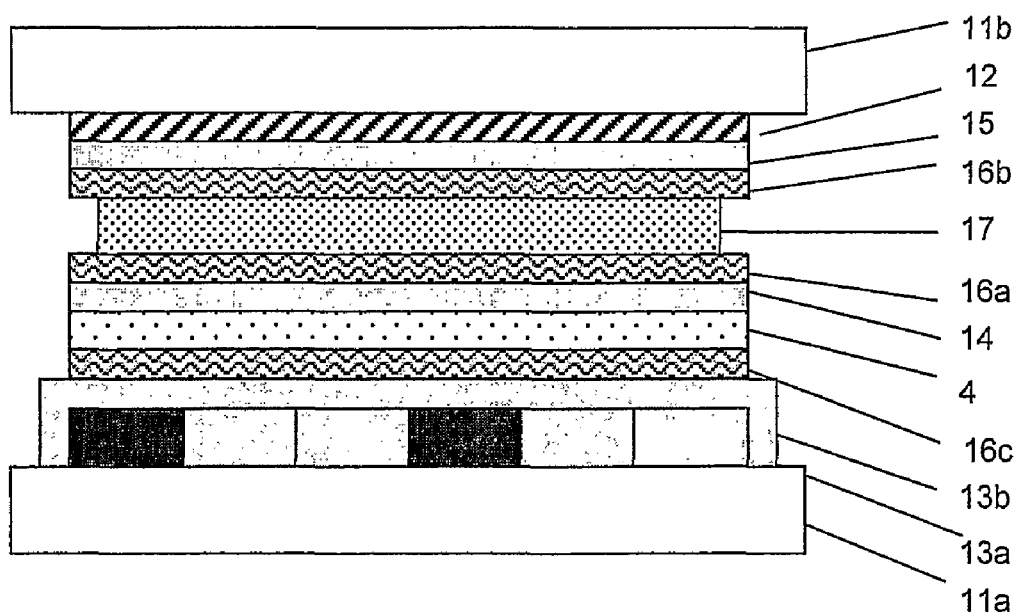
FIGS. 6A and 6B schematically depict the in-cell use of a biaxial film according to the present invention in a liquid crystal display.

An LCD according to this preferred embodiment is exemplarily depicted in FIG. 6A, comprising two substrates (11a, 11b), a TFT array (12), a colour filter array (13a), optionally a planarisation layer (13b), electrode layers ((14) and optionally (15)), optionally two alignment layers (16a, 16b), an LC medium (17), and a biaxial film (4) according to the present invention that is positioned between the planarisation layer and LC medium and optionally provided on another alignment layer (16c). Depending on the display mode, the planarisation layer (13a), the alignment layer (16a) and/or (16b), and one of the electrode layers (14) and (15) may also be omitted. Preferably, an alignment layer (16c) is present between the optical retardation film (4) and the planarisation layer (13b).

The biaxial film (4) can also be positioned directly (i.e. without the presence of an intermediate layer) on the colour filter array (13a) without the presence of a planarisation layer (13b), so that the optical retardation film serves as planarisation layer. It is also possible that the optical retardation film (4) is positioned between the colour filter array (13a) and the planarisation layer (13b). Preferably, an alignment layer (16c) is present between the optical retardation film (4) and the colour filter (13a).

Especially preferably, the biaxial film (4) is prepared directly on top of the colour filter (13a) or the planarisation layer (13b) inside the display cell, i.e. the colour filter or planarisation layer, optionally covered by an alignment layer, serve as substrate for the LC film preparation.

Figure 6B:
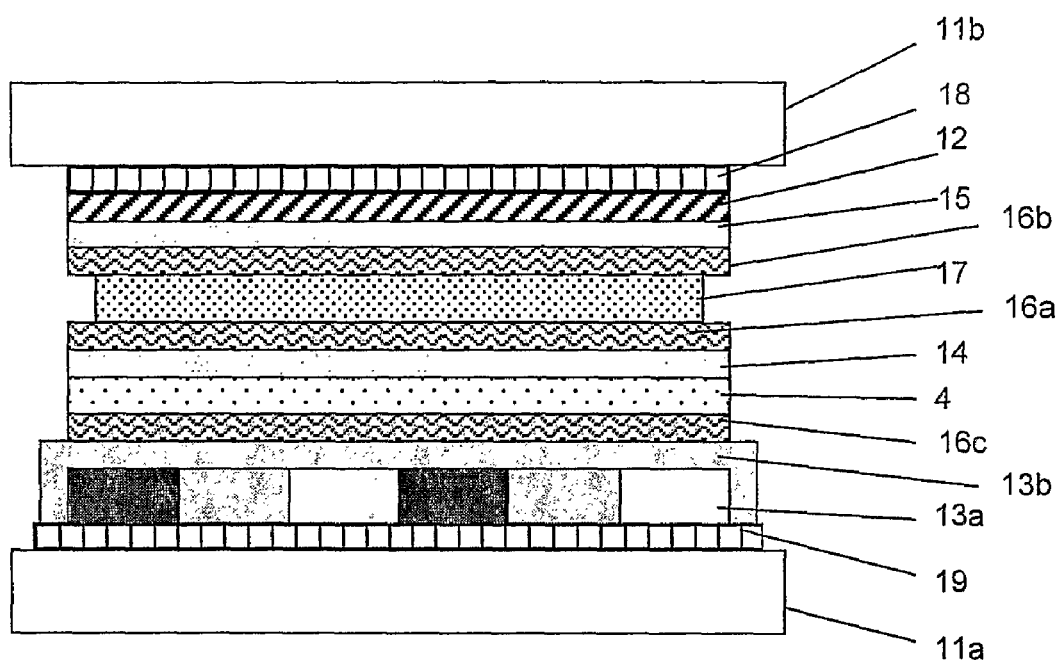

The first and second polarisers can be applied outside the LC cell, so that they are sandwiching the LC cell. Alternatively one or both polarisers can be applied inside the LC cell, so that they are sandwiching the LC medium. For example, in a display as shown in FIG. 6B, two polarisers (18) and (19) are applied on the inner surfaces of the substrates (11a, 11b) forming the LC cell.

Ideally the polarisers are applied directly to the inner surface of the substrates before application of the colour filter or TFT.

Especially suitable and preferred for incell use are linear polarisers comprising a polymerised or crosslinked liquid crystal material comprising a dichroic dye, as described for example in EP 0 397 263 A or EP 1 132 450 A.

As colour filter (13a) any standard colour filter known in prior art for use in flat panel displays can be used. Such a colour filter typically has a pattern of different pixels transmitting one of the primary colours red, green and blue (R, G, B).

Especially preferred are multiplexed or matrix displays, very preferably active matrix displays.

Another preferred embodiment relates to a biaxial film with a pattern of regions or pixels with three different retardations, the retardation values in these regions being adjusted such that the efficiency of converting linearly polarised light into circularly polarised light in each region or pixel is optimised for one of the colours R, G and B, and is preferably positioned on the colour filter such that each R-, G- or B-pixel of the colour filter is covered by a corresponding pixel of the biaxial film having a retardation optimised for this colour.

For example, a pixelated biaxial QWF can be constructed having three types of pixels with a retardation of approximately 112 nm, 137 nm and 150 nm, which correspond to approximately a quarter of the wavelength of the blue (B) pixel at 450 nm, green (G) pixel at 550 nm and red (R) pixel at 600 nm of the colour filter, respectively. A pixelated HWF can be prepared analoguously. In contrast, an unpixelated film will only provide an average uniform property for all areas of the display.

Alternatively or in addition to the RGB-pattern, the biaxial film can also have a pattern of areas having QWF (or HWF) retardation and areas having another retardation, e.g. zero retardation. Such a patterned film is especially suitable for as compensater in a patterned transflective display, e.g. a hole-in-mirror type transflective display as described e.g. in WO 03/019276 A2 or in van der Zande et al., SID Digest 14.2, 2003, page 194-197, S. Roosendaal et al., SID Digest 8.1, 2003, page 78-81 and M. Kubo et al., Procceedings of the IDW 1999, page 183-186.

It is also possible to use an unpatterned biaxial film according to the present invention for use in an LCD, e.g. of the VA or MVA type, as incell film, typically with a retardation of 25-60 nm.

In the invention and the preferred embodiments as described above, the A-plate is preferably a film of polymerised liquid crystal material with planar structure. The negative C-plate is preferably a film of polymerised liquid crystal material with short-pitch cholesteric structure and reflection in the UV range. The O-plate is preferably a film of polymerised liquid crystal material with splayed structure. However, it is also possible to use other A-plate, C-plate and O-plate retarders known from prior art. Suitable films are disclosed for example in U.S. Pat. No. 5,619,352 or WO 01/20393.

The biaxial film according to the present invention can be prepared from polymerisable chiral liquid crystal materials that are developed to allow the reflection wavelength of the mixture to be below that of the light that is normally used for polymerisation (typically at about 365 nm) and to enable local variation of the birefringence. This is achieved for example by adding one or more chiral components with high twist and/or in high amounts to push the Bragg reflection band into the UV, and by adding one or more photosensitive compounds.

In addition, the mixtures and materials according to the present invention allow to make the film production process suitable for manufacture on a plastic substrate, with a cure time of less than 5 minutes, which is especially suitable for mass production.

The polymerisable material is preferably a liquid crystal (LC) material with a chiral smectic or chiral nematic (cholesteric) LC phase or with a blue phase. Suitable smectic materials include for example an LC material with a chiral smectic C phase.

Especially preferably the polymerisable material is a cholesteric LC (CLC) material. Preferably it comprises one or more achiral polymerisable mesogenic compounds and at least one chiral compound. The chiral compounds can be selected from non-polymerisable chiral compounds, like e.g. chiral dopants as used in liquid crystal mixtures or devices, polymerisable chiral non-mesogenic or polymerisable chiral mesogenic compounds. Especially preferred are chiral dopants that have a high helical twisting power, as they give short-pitch CLC mixtures even if used in low amounts.

Especially preferred is a chiral polymerisable mesogenic material comprising a) at least one polymerisable mesogenic compound having at least one polymerisable group,
b) at least one chiral compound which may also be polymerisable and/or mesogenic, and which may be one of the compounds of component a) and/or c) or an additional compound,
c) at least one photosensitive compound, which may also be polymerisable and/or mesogenic, and which may be one of the compounds of component a) and/or b) or an additional compound, and optionally comprising one or more of the following components d) one or more non-mesogenic compounds having one, two or more polymerisable groups,
e) one or more photoinitiators,
f) in case the material is photopolymerised, one or more dyes showing an absorption maximum at a wavelength used to initiate photopolymerisation,
g) one or more chain transfer agents,
h) one or more surface-active compounds.

The chiral polymerisable mesogenic and LC materials as described above and below are another object of the invention.

Preferably the achiral and chiral compounds have different number of polymerisable groups.

In a preferred embodiment of the present invention the polymerisable material comprises at least one di- or multifunctional chiral polymerisable mesogenic compound and at least one mono-, di- or multifunctional achiral polymerisable mesogenic compound.

In another preferred embodiment of the present invention the polymerisable material comprises at least one monofunctional chiral polymerisable mesogenic compound and at least one mono-, di- or multifunctional achiral polymerisable mesogenic compound.

In another preferred embodiment the polymerisable material comprises at least one non-polymerisable chiral compound and at least one mono-, di- or multifunctional polymerisable mesogenic compound.

If di- or multifunctional polymerisable compounds are present in the polymerisable material, a polymer network is formed. An optical retardation film made of such a network is self-supporting and shows a high mechanical and thermal stability and a low temperature dependence of its physical and optical properties.

By varying the concentration of the di- and multifunctional compounds the crosslink density of the polymer film and thereby its physical and chemical properties such as the glass transition temperature, which is also important for the temperature dependence of the optical properties of the optical retardation film, the thermal and mechanical stability or the solvent resistance can be tuned easily.

A preferred polymerisable LC mixture comprises 0-80%, preferably 5 to 50% of one or more achiral mesogenic compounds having two or more polymerisable groups, 0-80%, preferably 5 to 50% of one or more achiral mesogenic compounds having one polymerisable group, 1-80%, preferably 5 to 50% of one or more polymerisable chiral mesogenic compounds and/or 0.1-20% of one or more non-polymerisable chiral compounds which may also be mesogenic, 5 to 100% of one or more photosensitive mesogenic compounds, which have preferably one or two polymerisable groups, 0 to 15%, preferably 0.01 to 10%, very preferably 0.05 to 5% of one or more photoinitiators, 0 to 10% of one or more chain transfer agents, 0 to 5% of one or more non-polymerisable or monofunctional, di- or multifunctional polymerisable surfactants.

Especially preferred are rod-shaped or board-shaped mesogenic or liquid crystal compounds.

Polymerisable mesogenic mono-, di- and multifunctional polymerisable compounds used for the present invention can be prepared by methods which are known per se and which are described, for example, in standard works of organic chemistry such as, for example, Houben-Weyl, Methoden der organischen Chemie, Thieme-Verlag, Stuttgart.

Examples of suitable polymerizable mesogenic compounds that can be used as monomers or comonomers in a polymerizable LC mixture according to the present invention are disclosed for example in WO 93/22397, EP 0 261 712, DE 195 04 224, WO 95/22586, WO 97/00600 and GB 2 351 734. The compounds disclosed in these documents, however, are to be regarded merely as examples that shall not limit the scope of this invention.

Examples of especially useful chiral and achiral polymerisable mesogenic compounds are shown in the following lists which should, however, be taken only as illustrative and is in no way intended to restrict, but instead to explain the present invention:

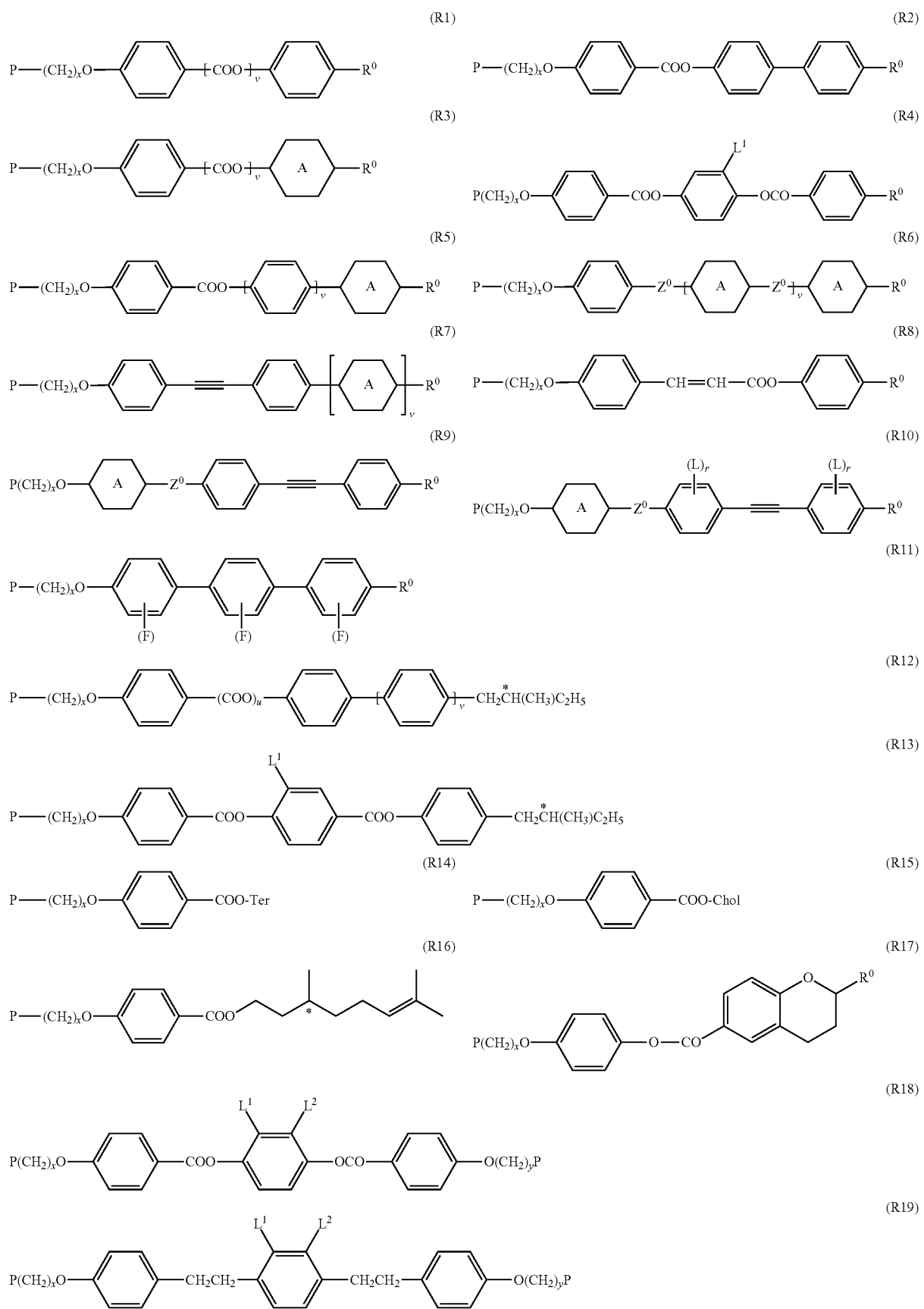

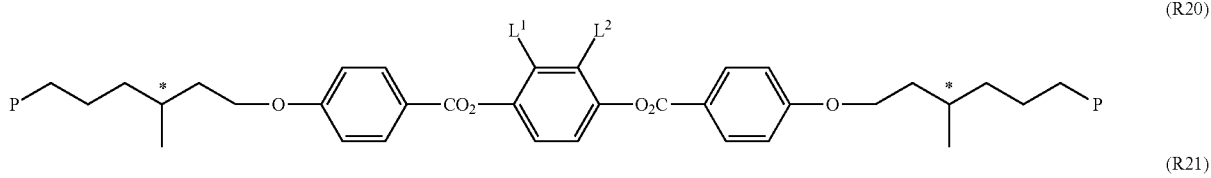
(R20)

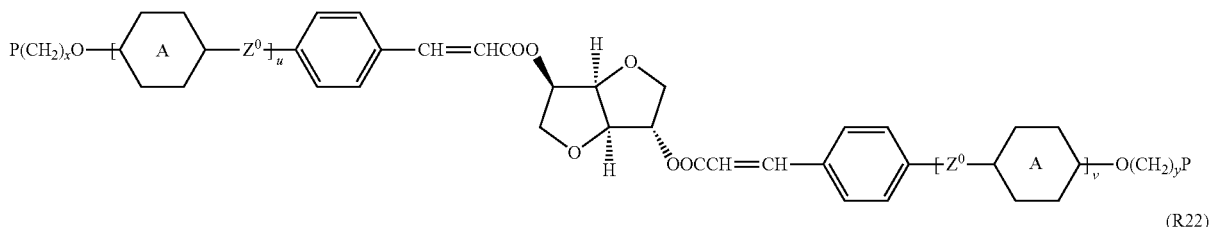
(R21)

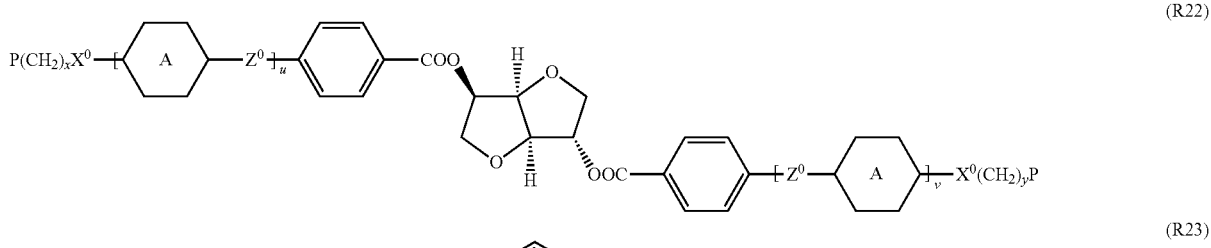
(R22)

(R23)

In the above formulae, P is a polymerisable group, preferably an acryl, methacryl, vinyl, vinyloxy, propenyl ether, epoxy, oxetane or styryl group, x and y are identical or different integers from 1 to 12, A is 1,4-phenylene that is optionally mono-, di- or trisubstituted by $L^1$, or 1,4-cyclohexylene, u and v are independently of each other 0 or 1, $Z^0$ and $X^0$ are independently of each other —O—, —S—, —COO—, —OCO—, —O—COO—, NR'—CO—NR'—, —O—CO—NR'—, NR'—COO—, —CH$_2$CH$_2$—, —CH=CH—, —C≡C— or a single bond, R' is H or alkyl with 1 to 6 C-atoms, $R^0$ is a polar group or an unpolar group, Ter is a terpenoid radical like e.g. menthyl, Chol is a cholesteryl group, L, $L^1$ and $L^2$ are independently of each other H, F, Cl, CN or an optionally halogenated alkyl, alkoxy, alkylcarbonyl, alkylcarbonyloxy, alkoxycarbonyl or alkoxycarbonyloxy group with 1 to 7 C atoms, and r is 0, 1, 2, 3 or 4. The phenyl rings in the above formulae are optionally substituted by 1, 2, 3 or 4 groups L.

The term 'polar group' in this connection means a group selected from F, Cl, CN, NO$_2$, OH, OCH$_3$, OCN, SCN, an optionally fluorinated alkycarbonyl, alkoxycarbonyl, alkylcarbonyloxy or alkoxycarbonyloxy group with up to 4 C atoms or a mono- oligo- or polyfluorinated alkyl or alkoxy group with 1 to 4 C atoms. The term 'non-polar group' means an optionally halogenated alkyl, alkoxy, alkycarbonyl, alkoxycarbonyl, alkylcarbonyloxy or alkoxycarbonyloxy group with 1 or more, preferably 1 to 12 C atoms which is not covered by the above definition of 'polar group'.

Suitable chiral dopants can be selected e.g. from the commercially available R- or S-811, R- or S-1011, R- or S-2011, R- or S-3011, R- or S-4011, R- or S-5011, or CB 15 (from Merck KGaA, Darmstadt, Germany). Very preferred are chiral compounds with a high helical twisting power (HTP), in particular compounds comprising a sorbitol group as described in WO 98/00428, compounds comprising a hydrobenzoin group as described in GB 2,328,207, chiral binaphthyl derivatives as described in WO 02/94805, chiral binaphthol acetal derivatives as described in WO 02/34739, chiral TADDOL derivatives as described in WO 02/06265, and chiral compounds having at least one fluorinated linkage group and a terminal or central chiral group as described in WO 02/06196 and WO 02/06195.

Suitable photoreactive or photosensitive compounds are known in prior art. These are for example compounds showing photoisomerisation, photo-fries rearrangement or 2+2-cycloaddition or another photodegradation process upon photoirradiation. Especially preferred are photoisomerisable compounds. Examples of these compounds include azobenzenes, benzaldoximes, azomethines, stilbenes, spiropyrans, spirooxadines, fulgides, diarylethenes, cinnamates. Further examples are 2-methyleneindane-1-ones as described for example in EP 1 247 796, and (bis-)benzylidene-cycloalkanones as described for example in EP 1 247 797.

Especially preferably the LC material comprises one or more cinnamates, in particular polymerisable mesogenic or liquid crystalline cinnamates for example as disclosed in GB 2 314 839, EP 03007236.7, U.S. Pat. No. 5,770,107 or EP 02008230.1 and their corresponding patents. Very preferably the LC material comprises one or more cinnamates selected of the following formulae

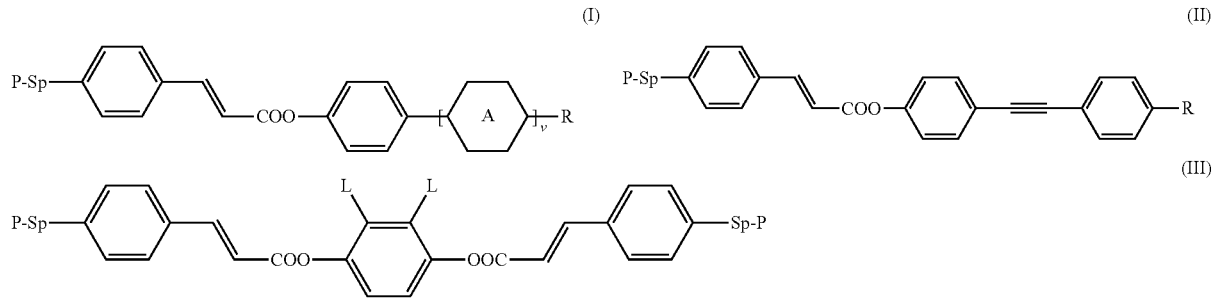

wherein P, A, L and v have the meanings given above, Sp is a spacer group, like for example alkylene, alkylene-oxy, alkylene-carbonyl, alkyleneoxy-carbonyl, alkylene-carbonyloxy or alkyleneoxy-carbonyloxy with 1 to 12 C-atoms, or a single bond, and R has the meaning of $R^o$ as defined above or denotes P-Sp.

Especially preferred are cinnamate RMs containing a polar terminal group $R^o$ as defined above. Very preferred are cinnamate RMs of formula I and II wherein R is a polar group $R^o$.

Further preferred are chiral polymerisable cinnamates, like for example chiral sorbitol cinnamates as described in GB 2 314 839 or EP 03007236.7 or cinnamates as described in U.S. Pat. No. 5,770,107 comprising a chiral group.

The photoradiation used to cause photoreaction in the LC material depends on the type of photosensitive compounds, and can be easily selected by the person skilled in the art. Generally, compounds that show photoreaction induced by UV-radiation are preferred. For example, for cinnamate compounds like those of formula III, IV and V, typically UV-radiation with a wavelength in the UV-A range (320-400 nm) or with a wavelength of 365 nm is used.

For preparation of a cholesteric film, the polymerisable LC material is preferably coated onto substrate, aligned into a uniform orientation and polymerised to permanently fix the cholesteric structure. As a substrate for example a glass or quarz sheet or a plastic film or sheet can be used. It is also possible to put a second substrate on top of the coated mixture prior to and/or during and/or after polymerisation. The substrates can be removed after polymerisation or not. When using two substrates in case of curing by actinic radiation, at least one substrate has to be transmissive for the actinic radiation used for the polymerisation. Isotropic or birefringent substrates can be used. In case the substrate is not removed from the polymerized film after polymerisation, preferably isotropic substrates are used.

Preferably at least one substrate is a plastic substrate such as for example a film of polyester such as polyethyleneterephthalate (PET) or polyethylenenaphthalate (PEN), of polyvinylalcohol (PVA), polycarbonate (PC) or triacetylcellulose (TAC), especially preferably a PET film or a TAC film. As a birefringent substrate for example an uniaxially stretched plastic film can be used. For example PET films are commercially available from DuPont Teijin Films under the trade name Melinex®.

The polymerisable LC material can be applied onto the substrate by conventional coating techniques like spin-coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

It is also possible to dissolve the polymerizable mesogenic material in a suitable solvent. This solution is then coated or printed onto the substrate, for example by spin-coating or printing or other known techniques, and the solvent is evaporated off before polymerization. In most cases it is suitable to heat the mixture in order to facilitate the evaporation of the solvent. As solvents for example standard organic solvents can be used. the solvents can be selected for example from ketones like e.g. acetone, methyl ethyl ketone, methyl propyl ketone or cyclohexanone, acetates like e.g. methyl, ethyl or butyl acetate or methyl acetoacetate, alcohols like e.g. methanol, ethanol or isopropyl alcohol, aromatic solvents like e.g. toluene or xylene, halogenated hydrocarbons like e.g. di- or trichloromethane, glycols or their esters like e.g. PGMEA (propyl glycol monomethyl ether acetate), γ-butyrolactone, and the like. It is also possible to use binary, ternary or higher mixtures of the above solvents.

Polymerisation of the LC material is preferably achieved by exposing it to heat or actinic radiation. Actinic radiation means irradiation with light, like UV light, IR light or visible light, irradiation with X-rays or gamma rays or irradiation with high energy particles, such as ions or electrons. Preferably polymerisation is carried out by photoirradiation, in particular with UV light, very preferably with linear polarised UV light. As a source for actinic radiation for example a single UV lamp or a set of UV lamps can be used. When using a high lamp power the curing time can be reduced. Another possible source for photoradiation is a laser, like e.g. a UV laser, an IR laser or a visible laser.

Polymerisation is preferably carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. UV photoinitiators are preferred, in particular radicalic UV photoinitiators.

Preferably the polymerisable mixture comprises one or more conventional or liquid crystal photoinitators. As standard photoinitiator for radical polymerisation for example the commercially available Irgacure® 651, Irgacure® 184, Darocure® 1173 or Darocure® 4205 (all from Ciba Geigy AG) can be used, whereas in case of cationic photopolymerisation the commercially available UVI 6974 (Union Carbide) can be used.

The curing time is dependent, inter alia, on the reactivity of the polymerisable material, the thickness of the coated layer, the type of polymerisation initiator and the power of the UV lamp. The curing time according to the invention is preferably not longer than 10 minutes, particularly preferably not longer than 5 minutes and very particularly preferably shorter than 2 minutes. For mass production short curing times of 3 minutes or less, very preferably of 1 minute or less, in particular of 30 seconds or less, are preferred.

The polymerisable LC material can additionally comprise one or more other suitable components such as, for example, catalysts, sensitizers, stabilizers, chain-transfer agents, inhibitors, accelerators, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

The mixture may also comprise one or more dyes having an absorption maximum adjusted to the wavelength of the radiation used for polymerisation, in particular UV dyes like e.g. 4,4'-azoxy anisole or the commercially available Tinuvin (from Ciba AG, Basel, Switzerland).

In another preferred embodiment the mixture of polymerisable material comprises up to 70%, preferably 1 to 50% of one or more non-mesogenic compounds with one polymerisable functional group. Typical examples are alkylacrylates or alkylmethacrylates.

It is also possible, in order to increase crosslinking of the polymers, to add up to 20% of one or more non-mesogenic compounds with two or more polymerisable functional groups to the polymerisable LC material alternatively or in addition to the di- or multifunctional polymerisable mesogenic compounds to increase crosslinking of the polymer. Typical examples for difunctional non-mesogenic monomers are alkyldiacrylates or alkyldimethacrylates with alkyl groups of 1 to 20 C atoms. Typical examples for multifunctional non-mesogenic monomers are trimethylpropanetrimethacrylate or pentaerythritoltetraacrylate.

It is also possible to add one or more chain transfer agents to the polymerisable material in order to modify the physical properties of the inventive polymer film. Especially preferred are thiol compounds, such as monofunctional thiol compounds like e.g. dodecane thiol or multifunctional thiol compounds like e.g. trimethylpropane tri(3-mercaptopropionate), very preferably mesogenic or liquid crystalline thiol compounds as for example disclosed in WO 96/12209, WO 96/25470 or U.S. Pat. No. 6,420,001. When adding a chain transfer agent, the length of the free polymer chains and/or the length of the polymer chains between two crosslinks in the inventive polymer film can be controlled. When the amount of the chain transfer agent is increased, the polymer chain length in the obtained polymer film is decreasing.

For preparing the cholesteric film, it is necessary to achieve planar alignment of the chiral polymerisable material, i.e. with the helical axis being oriented substantially perpendicular to the plane of the film. Planar alignment can be achieved for example by shearing the material, e.g. by means of a doctor blade. It is also possible to apply an alignment layer, for example a layer of rubbed polyimide or sputtered $SiO_x$, on top of at least one of the substrates. Planar alignment can also be achieved by rubbing the substrate without applying an additional alignment layer, e.g. by means of a rubbing cloth or a rubbing roller. Planar alignment with a low tilt angle can also be achieved by adding one or more surfactants to the polymerizable mesogenic material. Suitable surfactants are described for example in J. Cognard, Mol. Cryst. Liq. Cryst. 78, Supplement 1, 1-77 (1981). Particularly preferred are non-ionic surfactants, e.g. non-ionic fluorocarbon surfactants, like the commercially available Fluorad® (from 3M), or Zonyl FSN® (from DuPont), or polymerizable surfactants as disclosed in EP 1 256 617 A1. Further preferred are multi-block surfactants as disclosed in GB 2 383 040 A.

In some cases it is of advantage to apply a second substrate to aid alignment and exclude oxygen that may inhibit the polymerisation. Alternatively the curing can be carried out under an atmosphere of inert gas. However, curing in air is also possible using suitable photoinitiators and high UV lamp power. When using a cationic photoinitiator oxygen exclusion most often is not needed, but water should be excluded. In a preferred embodiment of the invention the polymerisation of the polymerisable material is carried out under an atmosphere of inert gas, preferably under a nitrogen atmosphere.

The invention claimed is:

1. Optical biaxial film, characterized in that it comprises an anisotropic material with a helically twisted structure and a uniform helix and reflects light of a wavelength of less than 400 nm.

2. Film according to claim 1, characterized in that has a local birefringence that varies periodically in the direction of the helical axis.

3. Film according to claim 1 having the principal refractive indices $n_x$ and $n_y$ in orthogonal directions in the film plane and $n_z$ perpendicular to the film plane, characterized in that $n_x \neq n_y \neq n_z$ and $n_x$, $n_y$ and $n_y > n_z$.

4. Film according to claim 1, characterized in that is substantially transparent for light with a wavelength of from 380 to 780 nm.

5. Film according to claim 1, characterized in that it comprises a crosslinked cholesteric material.

6. Film according to claim 1, characterized in that it has a pattern of different regions having different values of the optical retardation.

7. Film according to claim 1, characterized in that it is obtained by a process comprising the steps of
   A) providing a layer of a chiral polymerisable mesogenic material comprising at least one photosensitive compound, at least one chiral compound and at least one polymerisable compound, wherein these compounds can be identical or different, on a substrate where it aligns into planar orientation or is optionally aligned into planar orientation,
   B) irradiating the material with linear polarised light to induce photoreaction of the photosensitive compound(s) in selected regions of the material,
   C) polymerizing the chiral mesogenic material, and
   D) optionally removing the polymerized material from the substrate.

8. Film according to claim 1, characterized in that it is obtained from a chiral polymerisable mesogenic material comprising
   a) at least one polymerisable mesogenic compound having at least one polymerisable group,
   b) at least one chiral compound which may also be polymerisable and/or mesogenic, and which may be one of the compounds of component a) and/or c) or an additional compound, and
   c) at least one photosensitive compound, which may also be polymerisable and/or mesogenic, and which may be one of the compounds of component a) and/or b) or an additional compound,
   and optionally comprising one or more of the following components d) one or more non-mesogenic compounds having one, two or more polymerisable groups,
e) one or more photoinitiators,
f) in case the material is photopolymerised, one or more dyes showing an absorption maximum at a wavelength used to initiate photopolymerisation,
g) one or more chain transfer agents, and
h) one or more surface-active compounds.

9. Film according to claim 7, wherein the polymerisable material comprises at least one monofunctional chiral polymerisable mesogenic compound and at least one mono-, di or multifunctional achiral polymerisable mesogenic compound.

10. Film according to claim 7, wherein the polymerisable material comprises at least one di- or multifunctional chiral polymerisable mesogenic compound and at least one mono-, di or multifunctional achiral polymerisable mesogenic compound.

11. Film according to claim 7, wherein the polymerisable material comprises at least one non-polymerisable chiral compound and at least one mono-, di- or multifunctional achiral polymerisable mesogenic compound.

12. Compensator comprising at least one film according to claim 1.

13. Compensator according to claim 12, further comprising at least one retardation film with splayed or tilted structure.

14. Liquid crystal display comprising at least one film according to claim 1 wherein the film is optionally included in a compensator.

15. Liquid crystal display comprising the following elements
a liquid crystal cell formed by two transparent substrates having surfaces which oppose each other, an electrode layer provided on the inside of at least one of said two transparent substrates and optionally superposed with an alignment layer, and a liquid crystal medium which is present between the two transparent substrates,
a polariser arranged outside said transparent substrates, or a pair of polarisers sandwiching said substrates, and
at least one biaxial film according to claim 1 optionally included in a compensator, being situated between the liquid crystal cell and at least one of said polarisers,
it being possible for the above elements to be separated, stacked, mounted on top of each other or connected by means of adhesive layers in any combination of these means of assembly.

16. Liquid crystal display comprising
a liquid crystal (LC) cell comprising the following elements
a first and a second substrate plane parallel to each other, at least one of which is transparent to incident light,
an array of nonlinear electric elements on one of said substrates which can be used to individually switch individual pixels of said LC cell,
a colour filter array provided on one of said substrates and having a pattern of different pixels transmitting one of the primary colours red, green and blue (R. G. B), said colour filter optionally being covered by a planarisation layer,
a first electrode layer provided on the inside of said first substrate,
optionally a second electrode layer provided on the inside of said second substrate,
optionally first and second alignment layers provided on said first and second electrodes,
an LC medium that is switchable between at least two different orientations by application of an electric field,
a first (or 'front') linear polariser on the first side of the LC cell,
optionally a second (or 'back') linear polariser on the second side of the LC cell, and
at least one biaxial film according to claim 1 optionally included in a compensator,
characterized in that said biaxial film or compensator is situated between the first and second substrate of the LC cell.

17. Liquid crystal display according to claim 14, characterized in that is a display of the TN (twisted nematic), OCB (optically compensated bend), pi-cell, VA (vertically aligned) or MVA (multi-domain vertically aligned) mode or a transflective display.

18. A process for preparing a film according to claim 1, comprising the steps of
A) providing a layer of a chiral polymerisable mesogenic material comprising at least one photosensitive compound, at least one chiral compound and at least one polymerisable compound, wherein these compounds can be identical or different, on a substrate where it aligns into planar orientation or is optionally aligned into planar orientation,
B) irradiating the material with linear polarised light to induce photoreaction of the photosensitive compound(s) in selected regions of the material,
C) polymerizing the chiral mesogenic material, and
D) optionally removing the polymerized material from the substrate.

19. A film according to claim 7 which is a chiral polymerisable mesogenic material.

20. An optical device containing a film according to claim 1 as a retardation or compensation film.

21. An optical device of claim 19, which is a liquid crystal display.

22. Liquid crystal display according to claim 16, wherein:
the array of nonlinear electric elements on one of said substrates are active elements; and
the colour filter array is provided on the substrate opposite to that carrying the array of nonlinear elements.

23. Liquid crystal display according to claim 22, wherein:
the array of nonlinear electric elements on one of said substrates are transistors.

24. Liquid crystal display according to claim 22, wherein:
the array of nonlinear electric elements on one of said substrates are TFT transistors.

* * * * *